(12) United States Patent  (10) Patent No.: US 6,347,625 B1
Hill  (45) Date of Patent: *Feb. 19, 2002

(54) HEATING SYSTEM FOR A WIND MACHINE

(76) Inventor: Daryl G. Hill, 12814 Rutherford Rd., Yakima, WA (US) 98903

( * ) Notice: Subject to any disclaimer, the term of this patent is extended or adjusted under 35 U.S.C. 154(b) by 0 days.

This patent is subject to a terminal disclaimer.

(21) Appl. No.: 09/561,386

(22) Filed: Apr. 27, 2000

(51) Int. Cl.⁷ .............................................. A01G 13/06
(52) U.S. Cl. .............................. 126/59.5; 47/2; 239/77; 431/202; 431/247
(58) Field of Search .............................. 126/59.5; 47/2; 431/202, 233, 247; 239/77, 78; 416/95, 90 R

(56) References Cited

U.S. PATENT DOCUMENTS

| | | | |
|---|---|---|---|
| 2,712,714 A | * 7/1955 | McGee | |
| 3,067,541 A | * 12/1962 | Smith | |
| 3,377,743 A | * 4/1968 | Thompson et al. | ......... 126/59.5 |
| 5,082,177 A | * 1/1992 | Hill et al. | ......................... 47/2 |
| 6,182,652 B1 | * 2/2001 | Hill | ............................. 126/59.5 |
| 6,237,859 B1 | * 5/2001 | Hill | .............................. 239/77 |

FOREIGN PATENT DOCUMENTS

| | | | |
|---|---|---|---|
| CH | 674768 | * 7/1990 | .................. 431/247 |
| FR | 2486358 | * 1/1982 | ................. 126/59.5 |
| FR | 2577379 | * 8/1986 | ................. 126/59.5 |

* cited by examiner

Primary Examiner—Carl D. Price
(74) Attorney, Agent, or Firm—Startton Ballew PLLC

(57) ABSTRACT

A heating system for a tower mounted wind machine is provided. The heating system includes a burner that is rotatably mounted on the tower, in the air stream of the wind machine. The burner receives a combustible fuel conducted through a rotatable manifold on the central tower. The wind machine is a conventional type, generating the air stream by the rotation of a propeller. The wind machine is received on the top of a central tower. The manifold also mounts to the central tower, proximate the wind machine. The manifold has an inner ring and an outer ring. The inner ring mounts in a fixed position to the central tower, and the outer ring circumferentially mounts on the inner ring. The outer ring is rotatable relative to the inner ring. The inner ring includes a fuel inlet, and the outer ring includes a fuel outlet. The burner combusts the fuel that is conducted through the manifold to heat the air stream. The outer ring is cooperatively rotatable about the wind machine with respect to the central tower and is maintained in a synchronous position with respect to the wind machine.

6 Claims, 4 Drawing Sheets

HEATING SYSTEM FOR A WIND MACHINE

TECHNICAL FIELD

The invention relates to a heating system for a tower mounted wind machine and more particularly to an apparatus for delivering a combustible fuel to a burner, the burner rotatably mounted on the tower, in the air stream of the wind machine.

BACKGROUND OF THE INVENTION

Conventional wind machines are widely used in agricultural applications, often to prevent springtime frost damage to a crop by circling the air near the crop. To supplement the circulation of air with a direct heating of the air, the wind machines have been fitted with heaters.

Prior wind machine devices with heating features include U.S. Pat. No. 3,067,541 to Smith, which includes heater fuel combustion along the trailing edges of the wind machine's propeller blades. To deliver the fuel into the rotating propeller, a concentric set of tubing is employed within a rotary joint. The tubing set includes a stationary pipe received within a rotating pipe. O-ring seals are positioned within the overlapping flared and butted portions of the pipes, within the rotary joint, as detailed in FIG. 6, therein. A significant problem with this central rotary joint is that it cannot be applied to a conventional wind machine. The Smith '541 apparatus does not require a drive shaft and so the central, rotary joint can occupy this axial position. However, the drive shaft for the conventional wind machine's propeller is typically positioned in the rotational center of the wind machine's connection to the tower.

Another heating wind machine is found in U.S. Pat. No. 3,296,739 to Wiegel, which discloses a burner mounted near the hub of the propeller. A rotary connection supplies fuel through the rotating, upper section of the fan. The rotary connection of Wiegel '739 is detailed in FIG. 4, therein. The connection includes a hollow sleeve that couples to a fuel supply pipe. The hollow sleeve conducts the fuel into the upper section where it communicates with a lateral passage. An O-ring between the hollow sleeve and an upperjoint section establishes a fluid tight seal. The wind machine rotates on the tower or support about a vertical axis. The Wiegel rotary connection is a simple pipe connection and so must be positioned at the bulls-eye center of the wind machine's vertical axis of rotation. Weigel provides a source of mechanical power for the wind machine on the rotating, upper portion of the wind machine and so avoids the need for a drive shaft that extends upward, along the rotational axis of the support. A rotatable connection for delivering liquids and fuels for a tower mounted wind machine and heater is needed that does not require location at the center of the wind machine's vertical axis of rotation.

SUMMARY OF INVENTION

The present invention provides a heating system for a tower mounted wind machine. The invention includes a burner that is rotatably mounted on the tower, in the air stream of the wind machine. The burner receives a combustible fuel conducted through a rotatable manifold on the central tower.

The wind machine is a conventional type, generating the air stream by the rotation of a propeller. The wind machine is received on the top of a central tower. The manifold also mounts to the central tower, proximate the wind machine. The manifold has an inner ring and an outer ring. The inner ring mounts in a fixed position to the central tower, and the outer ring circumferentially mounts on the inner ring. The outer ring is rotatable relative to the inner ring. The inner ring includes a fuel inlet, and the outer ring includes a fuel outlet.

The heating system of the present invention further includes a burner mounted proximate the wind machine. The burner combusts the fuel that is conducted through the manifold. The fuel is combusted by the burner to heat the air stream.

According to an aspect of the present invention, the outer ring is cooperatively rotatable about the wind machine with respect to the central tower and is maintained in a synchronous position with respect to the wind machine.

One advantage of the present invention is that the manifold can be utilized for non-combustible fluids. The non-combustible fluids employed for purposes such a as frost protection, humidifying, cooling or agricultural chemical delivery and dispersing.

According to another advantage of the present invention, a heating system for a wind machine is provided that employs a ring shaped manifold, which does not interfere with the propeller drive of the conventionally configured wind machine.

Still further aspects and advantages of the invention will become apparent from consideration of the following figures and description.

DETAILED DESCRIPTION OF SPECIFIC EMBODIMENTS

The present invention is embodied in an apparatus as shown in FIGS. 1 through 4. The invention provides a heater apparatus 8 for a wind machine 10. The wind machines that can employ the present invention are used to service orchards and crops primarily for freeze protection. Additionally, these wind machines can be used for humidifying the air surrounding the orchards and crops, and sometimes also for dispersing agricultural chemicals.

Figure 1:
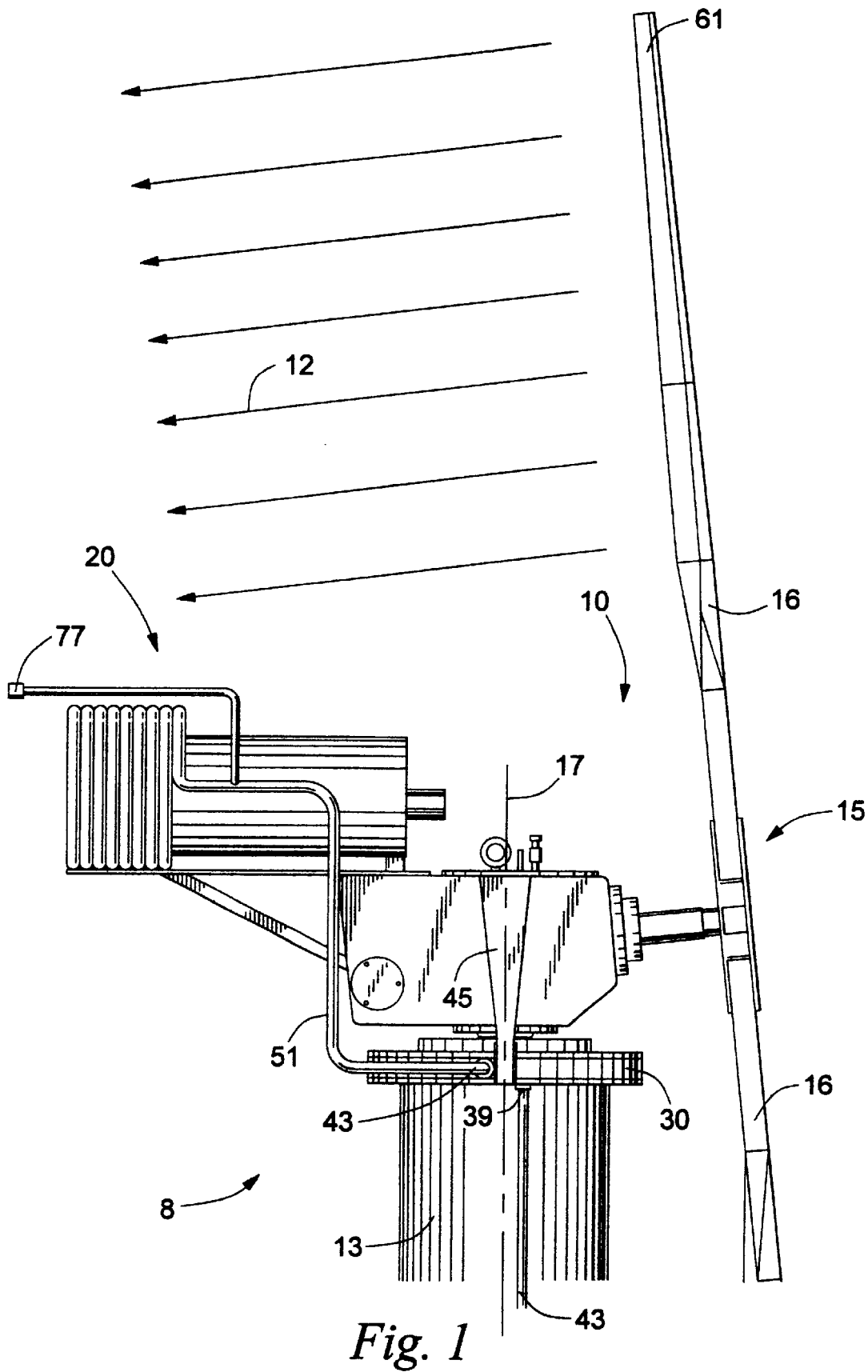
FIG. 1 is a side view of a heating system for a wind machine, according to an embodiment of the invention.

FIG. 1 details a preferred embodiment of the present invention that serves a typical wind machine 10, which is rotatably mounted upon a central tower 13. These conventional wind machines all generate a wind stream 12. The wind stream is an air stream, typically generated by the rotation of a propeller 15. Alternatively the wind stream can be generated by any similarly acting device, such as a fan or a turbine, which produces a directional stream of air in a sufficient quantity for the purposes of the present invention. For the present invention, the wind stream is most preferably directed as shown in FIG. 1, with the wind stream moving toward a burner 20 that is preferably mounted close to the wind machine, also on the central tower.

The wind machine 10 is a conventional type, generating the wind stream 12 by the rotation of a propeller 15. The propeller preferably has two blades 16, mounted opposed to each other. However three, four or more blades can be alternatively employed. The wind machine is preferably rotatable about the vertical axis 17 of the central tower 13. The wind stream can also be referred to as an air stream and can be selectably directed in a radius of 360 degrees about the central tower, by the rotation of the wind machine on the central tower.

Figure 2:
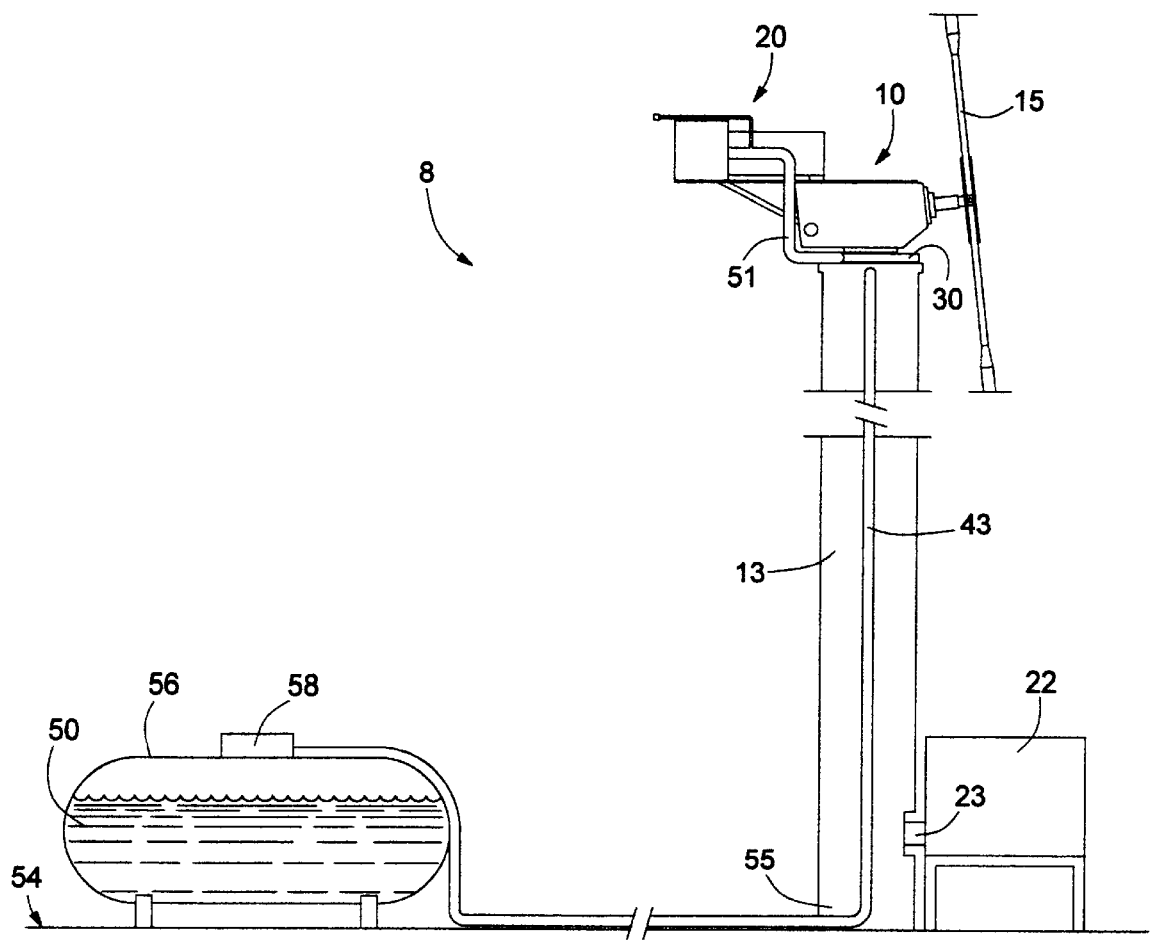
FIG. 2 is a side view of a heating system for a wind machine, according to an embodiment of the invention.

The propeller 15 of the wind machine 10 rotates by engagement to a drive motor 22, shown in FIG. 2. The drive motor rotates a drive shaft 23. The drive shaft preferably begins in a horizontal position from the drive motor and then transitions vertically up through the central tower to the wind machine. Within the wind machine, a transmission mechanism redirects the drive shaft to a substantially horizontal position and drives the attached propeller at a desired rotational speed.

As shown in FIG. 1, a manifold 30 is mounted on the central tower 13, proximate to and preferably beneath the wind machine 10. As detailed in FIG. 3, the manifold has an inner ring 36 and an outer ring 37. The inner ring fixedly mounts to and completely encircles the central tower. The inner ring includes a ring channel 38 that receives the fuel 50 from a fuel inlet 39. The fuel inlet attaches to the supply pipe 43, which can be located on the exterior of the central tower, as preferred, or alternatively in the interior of the central tower.

Figure 4:
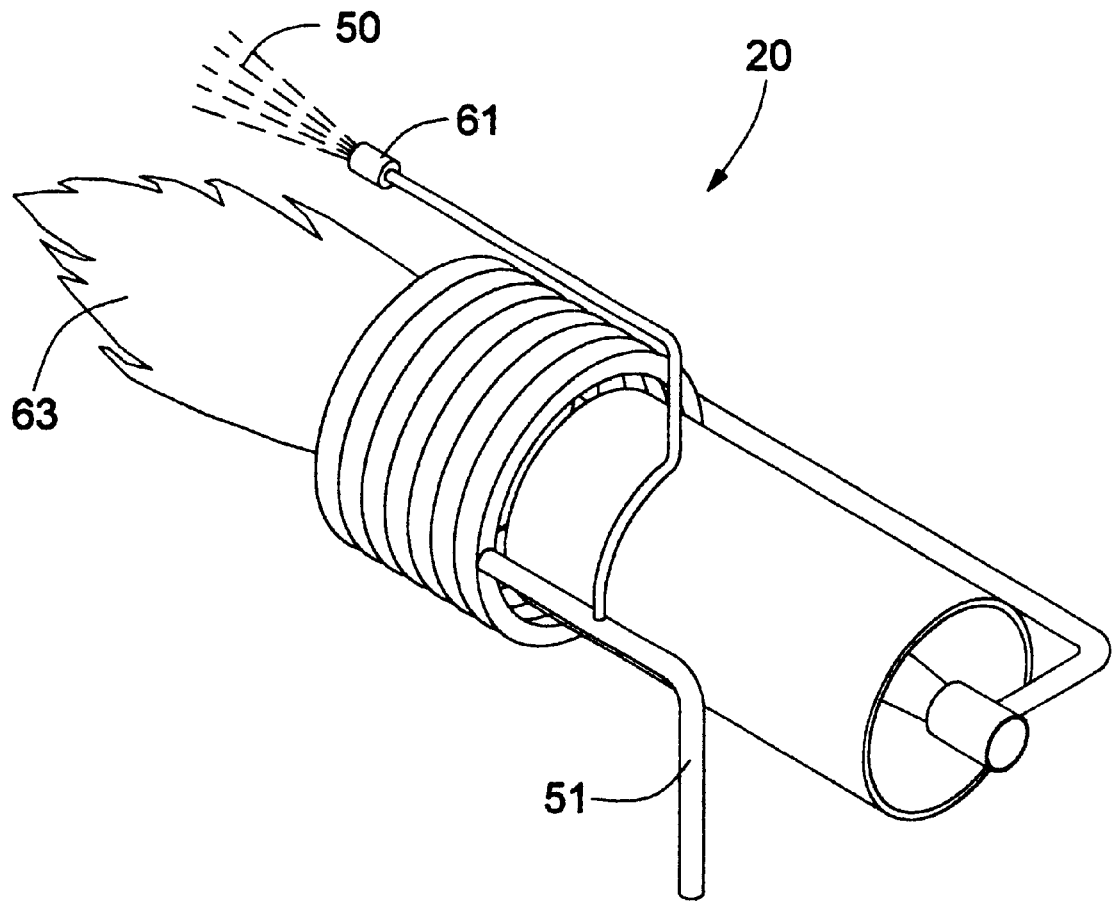
FIG. 4 is a perspective view of a burner of a heating system, according to an embodiment of the invention.

The manifold 30 receives the fuel 50 from the supply pipe 43 through the fuel inlet 39. The ring channel 38 in the inner ring 36 is filled and pressurized with the fuel. The fuel then exits through the fuel outlet 44 in the outer ring 37 to the burner 20. From the fuel outlet, the fuel is conducted to the burner 20 through a burner pipe 51, as shown in FIGS. 1 and 4.

Preferably, the fuel 50 is a light hydrocarbon, such as a typical natural gas product. Butane, propane, and methane each perform well for the present invention. The fuel can be stored in a tank 56, near the central tower 13, as shown in FIG. 2. More preferably, the light hydrocarbon fuel is used by the heater apparatus 8 of the present invention in a vaporized form, rather than in a pressurized, liquid state. The fuel is most preferably received into the manifold at an approximately ambient temperature. In extreme environments, the fuel can be heated or cooled as required to maintain satisfactory fuel flow. As an alternative, the fuel can be in a liquified state and still utilized.

Figure 3:
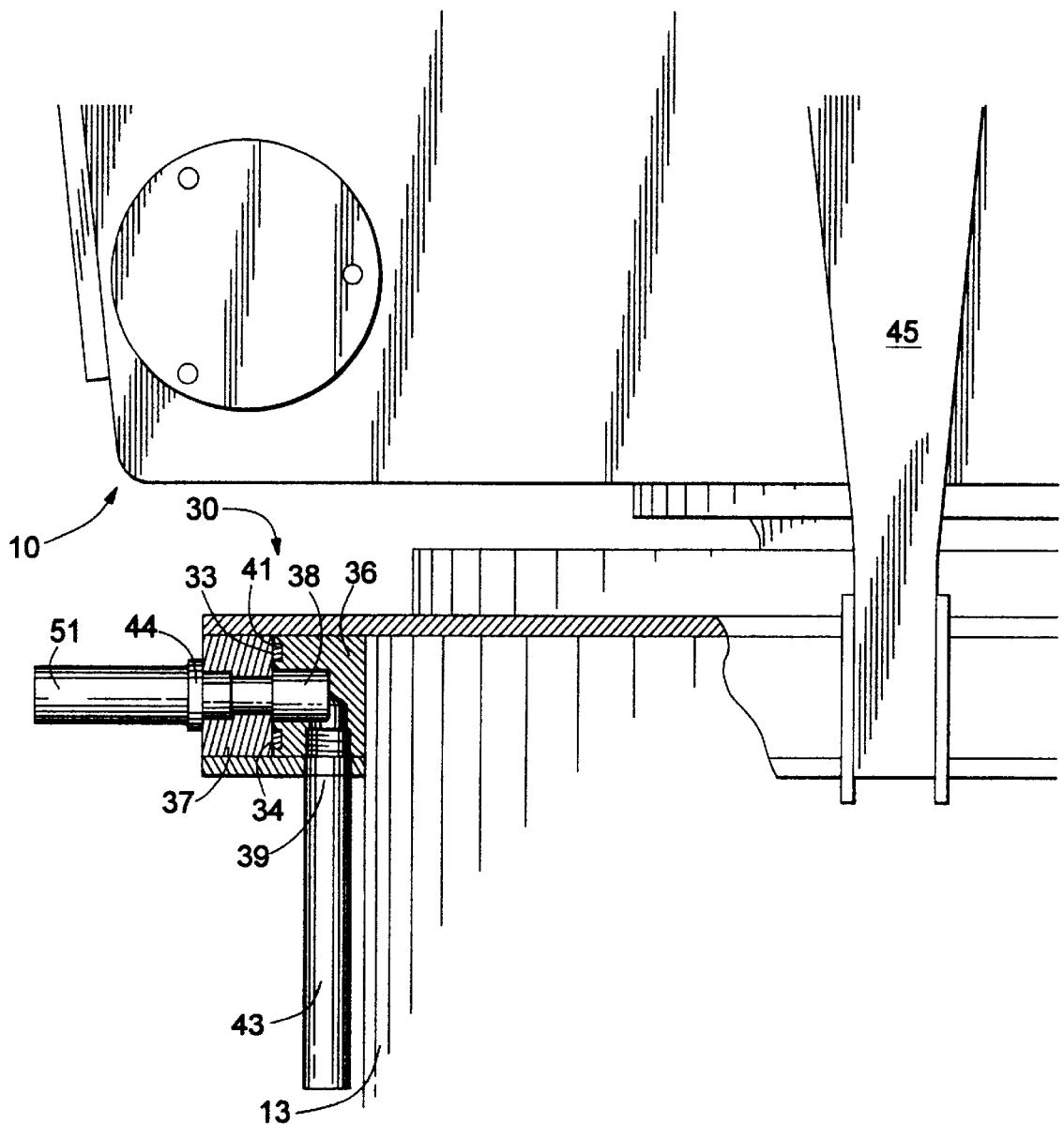
FIG. 3 is a partially sectioned portion a heating system for a wind machine, according to an embodiment of the invention.

The outer ring 37 of the manifold 30 is circumferentially mounted on the inner ring 36. The outer ring includes a fuel outlet 44. The outer ring is rotatable relative to the fixed, inner ring. As shown in FIG. 3, a pair of manifold O-rings 41 are preferably included between the inner ring and the outer ring to minimize leakage at their interface. The pair of O-rings preferably include an upper seal 33 and a lower seal 34. The upper seal and lower seal are selected to prevent leakage of the fuel 35 out of the manifold 30, over a wide range of operational temperatures and pressures. The upper seal mounts between the inner ring and the outer ring above the ring channel 38 and the lower seal mounts between the inner ring an the outer ring below the ring channel. Alternatively, the upper seal and the lower seal can be placed above and below the outer ring, or a similar position that still achieves a seal to fuel within the ring channel. Most preferably, the upper seal and the lower seal are manufactured from a linear length of a sealing material that circles the manifold between the inner and outer rings. Each of the linear lengths abuts to itself to form the desired ring shape.

The upper seal and the lower seal are shown in cross section in FIG. 3. An alternative preferred seal for use as the upper seal and the lower seal can be a typical O-ring. An O-ring is a ring-shaped device formed from a flexible material to provide a seal between two solid, abutting cylindrical parts.

To maintain the fuel outlet 44 in a synchronous position relative to the rotatable wind machine 10, a ring bracket 45 preferably connects the wind machine to the outer ring 37. The ring bracket slidably rotates the outer ring as the wind machine rotates on the central tower 13. This cooperative rotation of the outer ring to the wind machine also maintains the fuel outlet in position relative to the burner 20.

The manifold receives the fuel 50 from a supply pipe 43 that conducts the fuel up the central tower 13. Preferably, the fuel is pumped up the supply pipe at a pressure suitable for use by the burner 20. The fuel is preferably conducted to the fuel inlet 39 with the fuel supply pipe 43, as shown in FIG. 1. The central tower supports the fuel supply pipe. The fuel supply pipe can run on an exterior surface of the central tower, as shown in FIG. 2, or within the central tower. The central tower 13 is mounted to a ground surface 54 at a tower base 55. Most preferably, the fuel is stored in a tank 56, located proximate the tower base of the central tower, to which the tower fuel conduit can be connected. However, the fuel supply pipe can alternatively be connected directly to a fuel supply network, such as a natural gas supply grid. The tower fuel conduit can also includes a regulator 58, for reducing the pressure of the fuel from a near liquified state to a gas at near ambient pressure, which is better suited for the heater apparatus 8 of the present invention.

As a preferred alternative, the heater apparatus 8 of the present invention is utilized in agricultural heating applications. In such an embodiment, the target of the wind stream 12 is an orchard or crop growing area. Other applications for the heater apparatus are considered wherever a liquid or gas needs to be supplied to a rotatable air moving device, such as the wind machine 10, and especially when it is undesirable to route the liquid or gas directly through the wind machine's axis of rotation 17.

As shown in FIG. 4, the burner 20 can also include an igniter 61. The igniter receives the fuel 50, where it preferably electrically ignited to "fire off" the burner, producing a flame 63. The fuel fed to the igniter can be a specific mixture of the fuel and air to form an ignition mixture that is easily combusted. The fuel for the ignition mixture can be mixed with a source of combustion air, within a conventional carburetor device before flowing through the manifold 30, or after passing through the manifold.

The air stream 12 heated by the burner 20 can be directed toward a variety of general or specific targets. These targets can include orchards, vineyards, crops or any other areas that require the environmental modifications of a type that can be provided by the apparatus of the present invention.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the inven- The following is claimed:

1. A heater apparatus for a wind machine comprising:

a central tower having a top, the central tower for receiving a wind machine, and the wind machine for generating an air stream;

a manifold mounted on the exterior of the central tower proximate the wind machine, the manifold having an inner ring and an outer ring, the inner ring fixedly mounted to the exterior of the central tower, and the inner ring including a fuel inlet, the fuel inlet exterior to the central tower, the outer ring circumferentially mounted on the inner ring, the outer ring rotatable relative to the inner ring, and the outer ring including a fuel outlet, the fuel outlet exterior to the central tower;

a burner mounted proximate the wind machine, the burner for combusting a fuel from the fuel outlet of the manifold port, and the fuel combusted to heat the air stream, and the fuel receivable into the fuel inlet and distributable to the burner through the fuel outlet.

2. The apparatus of claim 1, wherein the outer ring of the manifold is cooperatively rotational to the wind machine with respect to the central tower.

3. The apparatus of claim 2, wherein the wind machine includes a ring bracket, the ring bracket mounted to the outer ring of the manifold and mounted to the wind machine, and the ring bracket for maintaining the outer ring in a synchronous position with respect to the wind machine.

4. A heater apparatus for a wind machine comprising:

a central tower having a top, a wind machine receivable onto the top of the central tower, and the wind machine for generating an air stream;

a manifold mounted on the exterior of the central tower, the manifold having an inner ring and an outer ring, the inner ring fixedly mounted the exterior of the central tower proximate the top of the central tower, and the inner ring including a fuel inlet, the fuel inlet exterior to the central tower, the outer ring circumferentially mounted on the inner ring, the outer ring rotatable relative to the inner ring, and the outer ring including a fuel outlet, the fuel outlet exterior to the central tower;

a burner mounted proximate the wind machine, the burner for combusting a fuel, and the fuel combusted to heat the air stream generated by the wind machine, and the fuel receivable into the fuel inlet of the inner ring and distributable to the burner through the fuel outlet of the outer ring.

5. The apparatus of claim 4, wherein the outer ring of the manifold is cooperatively rotational to the wind machine with respect to the central tower.

6. The apparatus of claim 5, wherein the wind machine includes a ring bracket, the ring bracket mounted to the outer ring of the manifold and mounted to the wind machine, and the ring bracket for maintaining the outer ring in a synchronous position with respect to the wind machine.

* * * * *